United States Patent Office 3,354,521
Patented Nov. 28, 1967

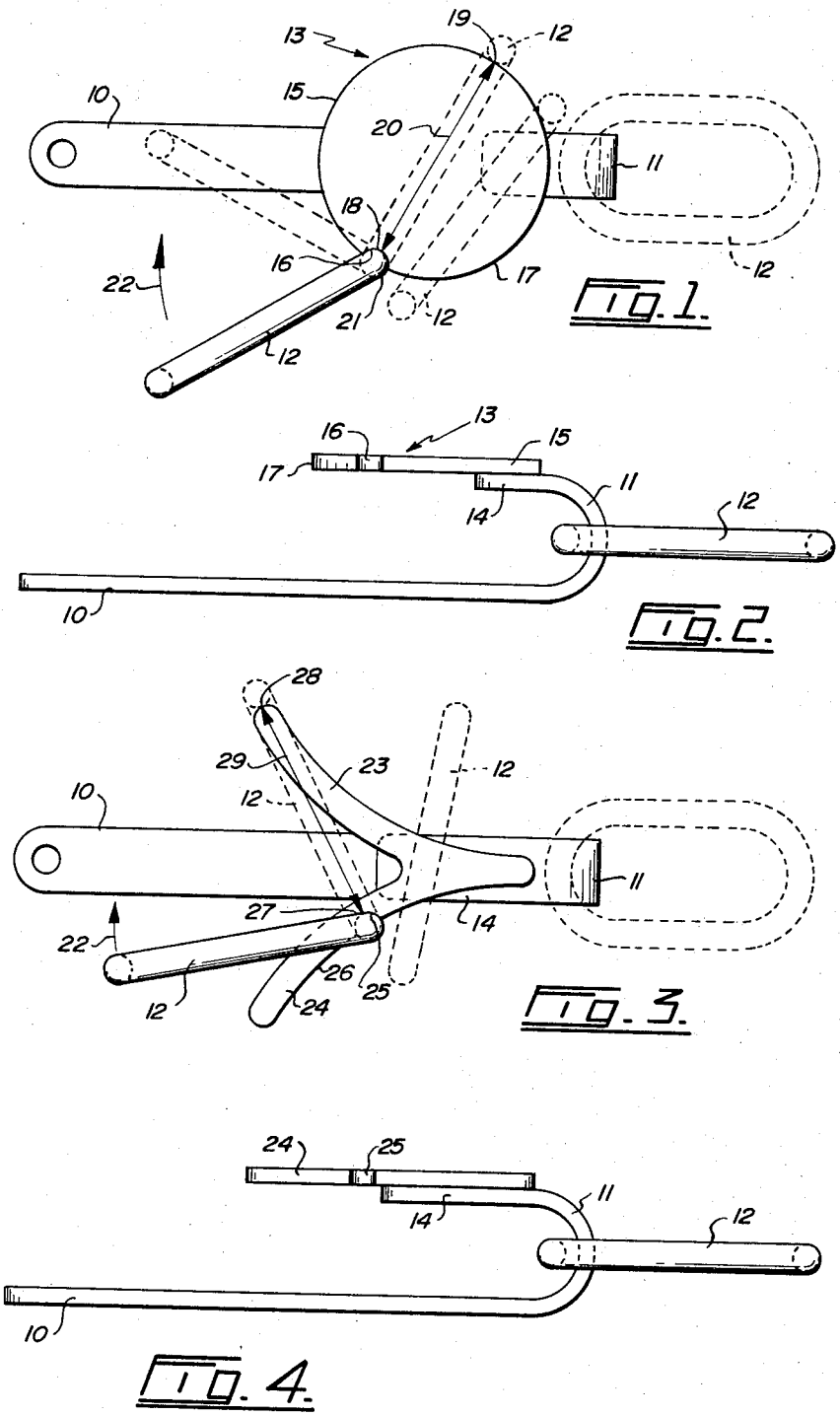

3,354,521
ATTACHMENT HOOK FOR CHAINS
Abraham D. Plett, Rosenort, Manitoba, Canada, assignor to A. D. Plett Enterprises Ltd., Rosenort, Manitoba, Canada
Filed Oct. 23, 1965, Ser. No. 503,710
2 Claims. (Cl. 24—230.5)

ABSTRACT OF THE DISCLOSURE

This device is a hook for receiving a chain link and includes an element to prevent the inadvertent disengagement of the chain link once in place. The span of this element is greater than the effective length of the chain link but is provided with a notch so that one end of the link can be recessed therein when engaging the chain thus permitting the chain to be engaged over the element.

---

This invention relates to new and useful improvements in attaching hooks for chains, particularly attaching hooks for chains of harrow draw bars and the like.

Conventional hooks often permit the chains to disengage particularly when the harrows are being turned. Another fault of conventional hooks is the fact that the chain links tend to jam on the hooks during turning.

It is well known that snap latches may be provided to prevent the disengagement of the chain links from the hook but these are not only expensive but tend to jam with dirt and the like and are time consuming to use.

I have overcome these disadvantages by providing chain retaining means above the hook of the device in which is formed a notch so that the distance between the base of the notch and the widest portion of the chain retainer is just less than the internal dimension of the major axis of the chain link engaging thereover so that the only way to disengage the chain link from the device is to place one end of the link within the notch whereupon the chain link can be engaged or disengaged over the retainer.

The principal object and essence of the invention is therefore to provide a device of the character herewithin described which prevents inadvertent disengagement of chains from a chain hook.

Another object of the invention is to provide a device of the character herewithin described in which desired engagement and disengagement of chain links is rapidly and easily accomplished.

Another object of the invention is to provide a device of the character herewithin described which does not utilize any moving parts which might become jammed due to dirt and the like.

A still further object of the invention is to provide a device of the character herewithin described which is simple in construction, economical in manufacture and otherwise well suited to the purpose for which it is designed.

With the foregoing in view, and all those objects, purposes or advantages which may become apparent from consideration of this disclosure and specification, the present invention consists of the inventive concept embodied in the method, process, construction, arrangement of parts, or new use of the same, as herein particularly exemplified in one or more specific embodiments of such concept, reference being had to the accompanying figures in which:

FIGURE 1 is a top plan view of my attachment hook showing the preferred embodiment.

FIGURE 2 is a side elevation thereof.

FIGURE 3 is a top plan view of an alternative embodiment.

FIGURE 4 is a side elevation thereof.

In the drawings like characters of reference indicate corresponding parts in the different figures.

Proceeding therefore to describe the invention in detail, reference character 10 illustrates the standard attaching shank which is normally secured to the drag harrows whereby they may be secured by chains to the towing means (not illustrated).

This shank is provided with a curved, hook engaging stem 11 formed on one end of the shank over which the chain link 12 engages in the normal manner.

In FIGURES 1 and 2, reference character 13 generally designates the chain retaining means secured upon the distal end 14 of the hook stem 11. In this embodiment this retaining means comprises a metal disc 15 welded upon the underside to the distal end 14.

This disc is provided with a notch 16 formed in one peripheral edge 17 and preferably adjacent a portion of the periphery remote from the point of attachment to the stem 14. The distance between the base 18 of the notch and a point 19 on the periphery of the disc diametrically opposite to the notch is indicated by the reference character 20 and this distance is slightly less than the internal measurement of the major axis of the chain link engaging thereover so that the only way that the chain link can be engaged over the retainer to engage the hook 11 is to first engage one curved end 21 of the link within the notch 16 whereupon the link can be moved over the disc in the direction of arrow 22 whereupon it can be engaged around the hook 11.

Disengagement is a reversal of the above mentioned proceedings and is believed to be clear from the foregoing description.

In FIGURE 3 the retaining means takes the form of a pair of diverging wing members 23 and 24 secured upon the distal end 14 of the hook portion 11 as hereinbefore described. The member 24 is provided with a notch 25 formed within one outer edge 26 thereof and the distance between the base 27 of the notch and the extremity 28 of the other wing member 23 is indicated by reference character 29. Here again this distance is just slightly less than the internal measurement of the major axis of the hook being engaged thereover.

In this instance, the curved end of the chain link is engaged within the notch 25 whereupon the link will pass over the extremity 28 so that the chain can then be engaged around the hook portion 11.

Since various modifications can be made to the invention herein described within the scope of the inventive concept disclosed, it is not intended that protection of the said invention should be interpreted as restricted to the modification or modifications or known parts of such concept as have been particularly described, defined, or exemplified, since this disclosure is intended to explain the construction and operation of such concept, and not for the purpose of limiting protection to any specific embodiment or details thereof.

What I claim as my invention is:

1. An attachment hook for chains of harrow draw bars and the like comprising in combination an attaching shank, a curved hook engaging stem on one end of said shank, and chain retaining means on the distal end of said stem, said chain retaining means including a chain link engaging notch formed therein, said chain retaining means comprising a substantially disc shaped plate, said notch being formed in the periphery thereof, the distance between the base of said notch and the periphery of said plate at a point diametrically opposite to said notch being less than the internal dimension of the major axis of the chain link engaging thereover.

2. An attachment hook for chains of harrow draw bars and the like comprising in combination an attaching shank, a curved hook engaging stem on one end of said shank, and chain retaining means on the distal end of said stem, said chain retaining means including a chain link engaging notch formed therein, said chain retaining means including two diverging wing members, said notch being formed in the outer side edge of one of said members, the distance between the base of said notch and the distal end of the other of said members being less than the internal dimension of the major axis of the chain link engaging thereover.

References Cited
UNITED STATES PATENTS

| | | | |
|---|---|---|---|
| 131,224 | 9/1872 | Paul | 294—82 X |
| 1,060,744 | 5/1913 | Covert | 59—85 |
| 1,535,060 | 4/1925 | Tirrill | 59—89 |

DONALD A. GRIFFIN, *Primary Examiner.*